United States Patent
Jiang

(10) Patent No.: US 6,631,738 B2
(45) Date of Patent: Oct. 14, 2003

(54) FLOW CONTROL VALVE

(75) Inventor: Mingxiang Jiang, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/739,414

(22) Filed: Dec. 18, 2000

(65) Prior Publication Data

US 2002/0074049 A1 Jun. 20, 2002

(51) Int. Cl.⁷ ................................. F15D 1/00
(52) U.S. Cl. .................. 138/46; 138/43; 138/45
(58) Field of Search ................. 138/46, 45, 43

(56) References Cited

U.S. PATENT DOCUMENTS

| | | | |
|---|---|---|---|
| 1,376,596 A | * 5/1921 | West .......................... 138/46 |
| 3,139,114 A | * 6/1964 | Benzel ........................ 138/45 |
| 3,202,168 A | 8/1965 | Klinefelter | |
| 3,319,742 A | 5/1967 | Cumming | |
| 3,437,082 A | * 4/1969 | Bouwkamp et al. ........ 123/574 |
| 3,489,172 A | * 1/1970 | Whitmore .................. 138/43 |
| 3,659,433 A | * 5/1972 | Shaw ......................... 138/45 |
| 3,799,132 A | * 3/1974 | MacGuire ................... 138/45 |
| 3,834,415 A | 9/1974 | Herron | |
| 3,847,178 A | * 11/1974 | Keppel ........................ 138/46 |
| 4,075,294 A | * 2/1978 | Saito et al. ................. 138/45 |
| 4,100,940 A | * 7/1978 | Spears ......................... 138/45 |
| 4,413,615 A | 11/1983 | Sigworth, Jr. | |
| 4,482,035 A | * 11/1984 | Heideman et al. ........... 138/42 |
| 4,562,960 A | * 1/1986 | Marty et al. ................. 138/45 |
| 4,663,056 A | 5/1987 | Leech | |
| 4,726,527 A | * 2/1988 | Mendenhall ................ 239/542 |
| 5,065,786 A | 11/1991 | Rozenblatt | |
| 4,489,744 A | 12/1994 | Merrill | |
| 5,400,967 A | * 3/1995 | Yu ............................. 239/106 |
| 5,762,093 A | 6/1998 | Whitley, II | |

* cited by examiner

Primary Examiner—James Hook
(74) Attorney, Agent, or Firm—Liell & McNeil

(57) ABSTRACT

A valve or ball reversal orifice provides provide a first flow restriction to a material flowing through the ball reversal orifice and a second flow restriction when the material reverses flow direction. The valve includes a housing having at least first and second walls that define a cavity therein. The cavity is configured such that a cross-sectional area of the cavity taken perpendicular to a longitudinal axis of the cavity decreases from the second wall to the first wall. A first port is provided in the first wall for allowing material to enter or exit a cavity, and a second port is provided in the second wall for allowing material to enter or exit the cavity. A flow restrictor, such as a ball, disposed in the cavity and is movable between a relatively large portion of said cavity and a relatively small portion of said cavity to provide different flow restriction depending on the direction of material flow through the cavity.

14 Claims, 4 Drawing Sheets

FLOW CONTROL VALVE

TECHNICAL FIELD

The present invention relates generally to flow control valves, and more particularly to a flow control valve and related methods for use in fuel injectors for internal combustion engines.

BACKGROUND ART

In one class of fuel injector control systems, a conduit requires different flow restriction depending on the direction of flow through the conduit. In the past, flow control valves have been formed using a first passageway and a second passageway that were connected in parallel. The first passageway included a first check valve and a first flow restrictor. The second passageway included a second check valve and a second flow restrictor. The first check valve would allow the fluid flow to flow in a first direction through the first passageway. At the same time, the second check valve would prevent flow from passing through the second passageway. Thus, the first flow restrictor would provide a first level of flow restriction. When the flow direction reversed, the first check valve would prevent flow through the first passageway and the second flow restrictor would allow flow through the second passageway. The second flow restrictor would provide a second level of flow restriction. Thus, the first flow restrictor and the second flow restrictor would provide two different levels of flow restriction.

Unfortunately, the first and second parallel passageways and the check valves and flow restrictors required a large space. They could not be easily located in the small space within a hydraulic control system. Additionally, the first and second flow restrictors would clog with solid material being carried in the fluid flow.

The present invention is directed toward overcoming one or more of the problems as set forth above.

DISCLOSURE OF THE INVENTION

In accordance with one aspect on this invention, a valve comprises a housing having at least first and second walls that define a cavity therein. The cavity is configured such that a cross-sectional area of the cavity taken perpendicular to a longitudinal axis of the cavity decreases from the second wall to the first wall. A port is provided in the first wall for allowing material to enter or exit a cavity, and a port is provided in the second wall for allowing material to enter or exit the cavity. A flow restrictor disposed in the cavity.

In accordance with another aspect of this invention, the valve described above comprises a flow control valve for a fuel injector.

In still another aspect of this invention, a method for controlling flow of fluid in a hydraulic device is disclosed. The method comprises providing a valve having a housing which defines a cavity therein, with the cavity having a first portion having a relatively large cross-sectional area taken perpendicular to a longitudinal axis of the cavity and a second portion having a relatively small cross-sectional area taken perpendicular to the longitudinal axis. The method further comprises flowing material through the cavity in a first direction which causes a flow restrictor disposed in the cavity to occupy a position substantially in the first portion of the cavity, whereby flow of the material in the first direction is relatively unrestricted. The method further comprises flowing material through the cavity in a second direction opposite the first direction which causes the flow restrictor to occupy a position substantially in the second portion of the cavity, whereby flow of the material in the second direction is relatively restricted.

The foregoing and other features and advantages of the invention will be apparent from the following more particular description of preferred embodiments of the invention.

BEST MODE FOR CARRYING OUT THE INVENTION

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. Although the drawings are intended to illustrate the present invention, the drawings are not necessarily drawn to scale.

Figure 1:
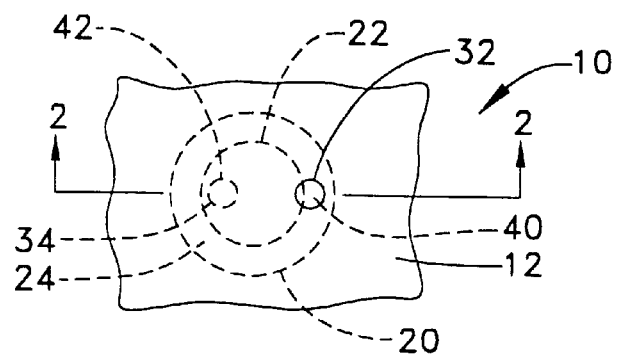
FIG. 1 is top view of a valve or ball reversal orifice comprising a cavity with a conical portion.
Figure 2:
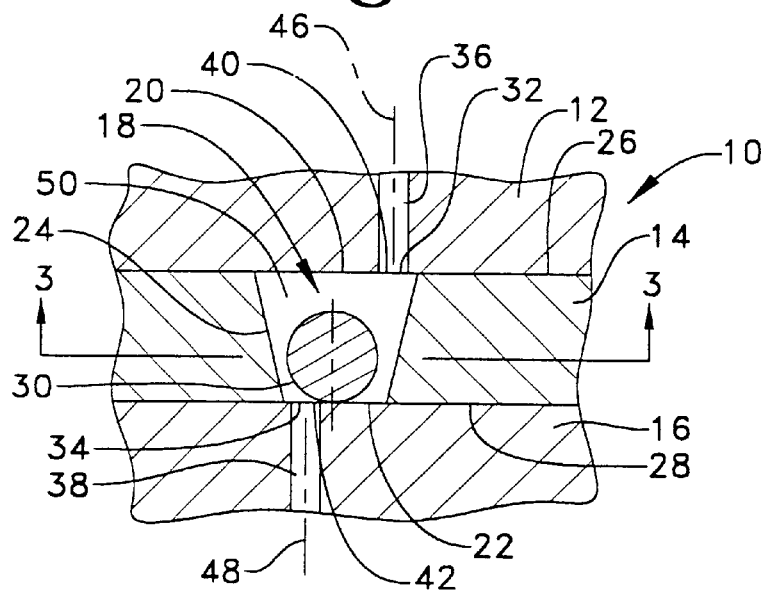
FIG. 2 is a cross-sectional view of the valve or ball reversal orifice taken along line 2—2 of FIG. 1.

Referring to FIG. 1, a top view of a valve or so-called ball reversal orifice 10, is shown. FIG. 2, is a cross-sectional view of the valve or ball reversal orifice 10 taken along line 2—2 of FIG. 1. FIG. 2 shows a first plate 12, a second plate 14, and a third plate 16. The plates 12, 14, and 16 cooperate to form a valve housing defining a cavity 18. The housing may be formed from fewer parts, such as by combining together one or more of the plates 12, 14, and 16 into a unitary part. The cavity 18 includes a first wall 20, a second wall 22, and a conical portion 24. The first wall 20 and the second wall 22 are connected to the conical portion 24. The first wall 20 is larger in area than the second wall 22. The first wall 20 of the cavity 18 is a portion of the surface 26 of the plate 12. The conical portion 24 of the cavity 18 is formed in the plate 14. The second wall 22 of the cavity 18 is a portion of the surface 28 of the plate 16.

A ball 30 is enclosed within the cavity 18, and is free to move within the cavity 18. FIG. 2 shows a port 32 in the first wall 20 of the cavity 18, and a port 34 in the second wall 22 of the cavity 18. A first conduit 36 is attached to the port 32, and a second conduit 38 is attached to the port 34. A center 40 of the port 32 is always offset from the centerline 44 of the ball 30. A center 42 of the port 34 is always offset from the centerline 44 of the ball 30. A longitudinal axis 46 of the first conduit 36 is always offset from the centerline 44 of the ball 30. This ensures that the ball 30 will never cover and close the port 32 or the port 34. A longitudinal axis 48 of the second conduit 38 is always offset from the centerline 44 of the ball 30. In this embodiment, the longitudinal axis 46 of the first conduit 36 is offset from the longitudinal axis 48 of the second conduit 38. Material 50 including fluid containing suspended particles may freely flow through the ports 32 and 34.

Figure 3:
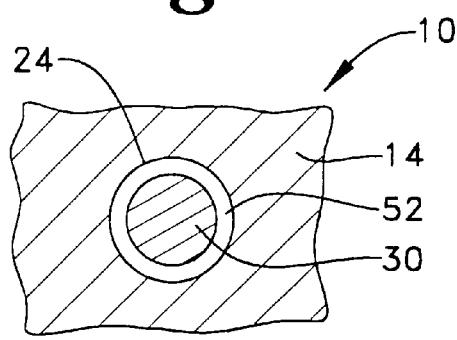
FIG. 3 is a cross-sectional view of the conical portion of the cavity and a ball taken along line 3—3 of FIG. 2.

FIG. 2 shows a ball location with material 50 flowing in a first direction through the first conduit 36, through the port 32, through the cavity 18, and exiting through the port 34 into the second conduit 38. The material 50 may be, e.g., a liquid, a hydraulic fluid, a gas, or a plurality small particles. The small particles may be suspended in the gas or liquid. FIG. 3 shows a cross-sectional view taken along line 3—3 of FIG. 2. A gap 52 is formed between the ball 30 and a frusto-conical portion 24. The material 50 flow is restricted as the material 50 flows through the gap 52.

Figure 4:
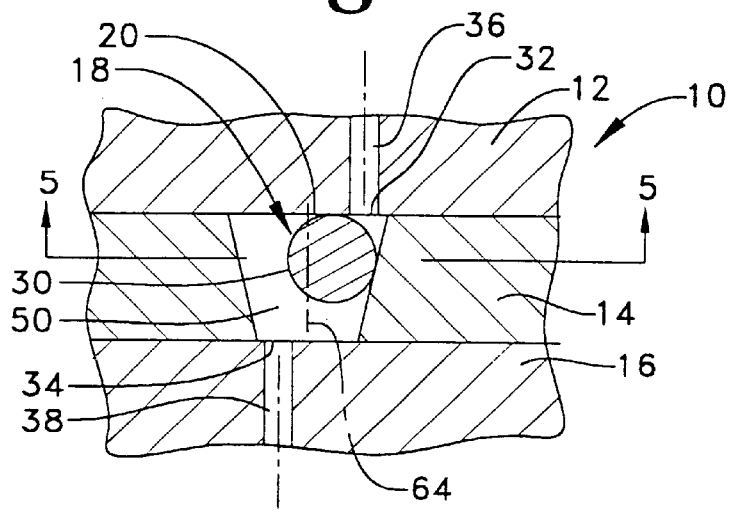
FIG. 4 is a cross-sectional view of the ball reversal orifice with flow reversal.
Figure 5:
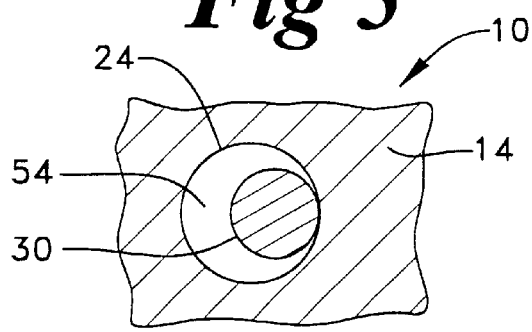
FIG. 5 is a cross-sectional view of the conical portion of the cavity and the ball taken along line 5—5 of FIG. 4.

FIG. 4 shows the ball reversal orifice 10 with the material 50 flowing in a second direction through the second conduit 38, through the port 34, through the cavity 18, and exiting through the port 32 into the first conduit 36. The material flow pushes the ball 30 against the first wall 20 of the cavity 18. FIG. 5 shows a cross-sectional view taken along line 5—5 of FIG. 4. A gap 54 is formed between the ball 30 and a frusto-conical portion 24. The gap 54 is larger in flow area than the flow area created by gap 52 (FIG. 3). Therefore, there is greater restriction to material 50 flow when the material 50 flow is in the first direction, from the port 32 to port 34, then when the material 50 flow is in the second direction, from port 34 to 32. FIG. 4 illustrates a longitudinal axis 64 of the cavity 18.

Figure 6:
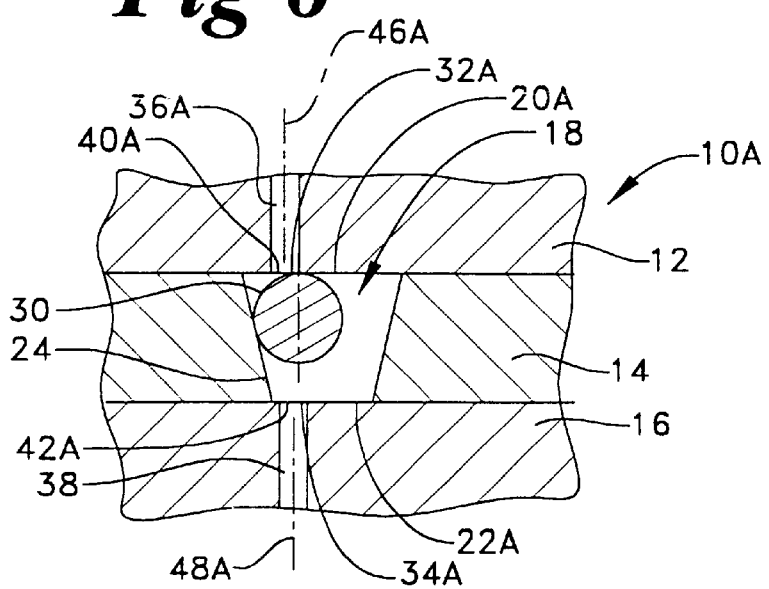
FIG. 6 is a cross-sectional view of ball reversal orifice with a port in the first wall of the cavity in-line with a port in the second wall of the cavity.

FIG. 6 shows another embodiment of the valve or ball reversal orifice 10A of the present invention. A port 32A is located in the first wall 20A of the cavity 18. A port 34A is located in the second wall 22A of the cavity 18. A first conduit 36A is attached to the port 32A, and a second conduit 38A is attached to the port 34A. A center 40A of the port 32A is always offset from the centerline 44 of the ball 30. A center 42A of the port 34A is always offset from the centerline 44 of the ball 30. A longitudinal axis 46A of the first conduit 36A is always offset from the centerline 44 of the ball 30. A longitudinal axis 48A is always offset from the centerline 44 of the ball 30. This ensures that the ball 30 will never cover and close the port 32A or the port 34A. In this embodiment, the longitudinal axis 46A of the first conduit 36A, the center 40A of the port 32A, the longitudinal axis 48A of the second conduit 38A, and the center 42A of the port 34A, all in-line. However, this in-line axis is always offset from the centerline 44 of the ball 30.

Figure 7:
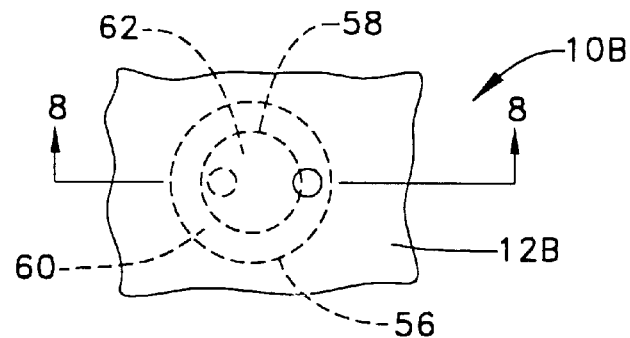
FIG. 7 is a top view of another embodiment of a ball reversal orifice comprising a cavity including a first cylindrical portion and a second cylindrical portion.
Figure 8:
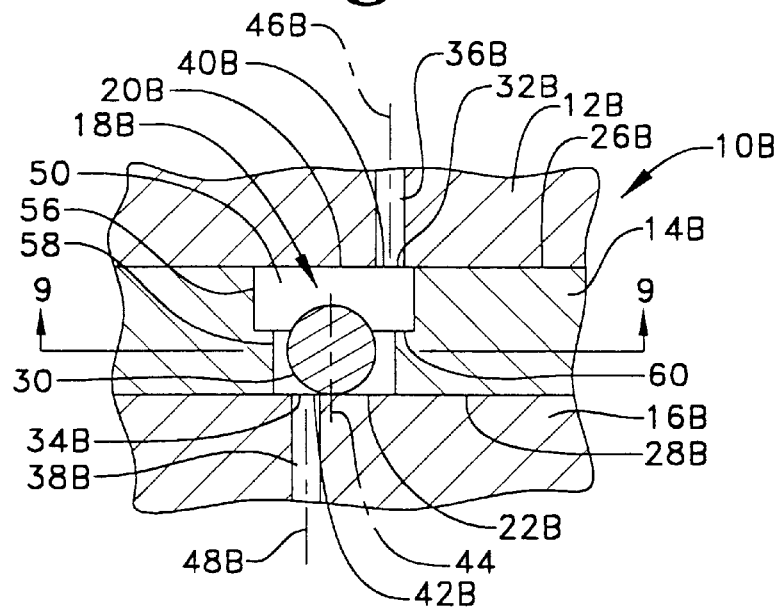
FIG. 8 is a cross-sectional view of the ball reversal orifice taken along line 8—8 of FIG. 7.

Referring now to FIG. 7, still another embodiment of the valve or ball reversal orifice 10B is illustrated. FIG. 7 shows a top view of the ball reversal orifice 10B. FIG. 8 is a cross-sectional view of the ball reversal orifice 10B taken along line 8—8 of FIG. 7. FIG. 8 shows a first plate 12B, a second plate 14B, and a third plate 16B. A cavity 18B includes a first wall 20B, a second wall 22B, a first cylindrical portion 56, a second cylindrical portion 58, and a connector surface 60. The first cylindrical portion 56 is preferably concentric with the second cylindrical portion 58, but could be eccentric if desired. The diameter of the first cylindrical portion 56 is larger than the diameter of the second cylindrical portion 58. The first wall 20B of the cavity 18B is connected to the first cylindrical portion 56. The first cylindrical portion 56 is connected to the second cylindrical portion 58 by the connector surface 60. The connector surface 60 includes an opening 62 corresponding to the diameter of the second cylindrical portion 58. The second cylindrical portion 58 is connected to the second wall 22B. The first wall 20B of the cavity 18B is a portion of a surface 26B of the first plate 12B. The first cylindrical portion 56, the second cylindrical portion 58 and the surface 60 are formed in the plate 14B. The second wall 22B of the cavity 18B is a portion of a surface 28B of the plate 16B. The ball 30 is enclosed within the cavity 18B, and is free to move within the cavity 18B. FIG. 8 shows a port 32B in the first wall 20B of the cavity 18B, and a port 34B in the second wall 22B of the cavity 18B. A first conduit 36B is attached to the port 32B, and a second conduit 38B is attached to the port 34B. A center 42B of the port 341 is always offset from the centerline 44 of the ball 30. A longitudinal axis 46B of the first conduit 36B is always offset from the centerline 44 of the ball 30. A longitudinal axis 48B of the second conduit 38B is always offset from the centerline 44 of the ball 30. The longitudinal axis 46B of the first conduit 36B is offset from the longitudinal axis 48B of the second conduit 38B. This ensures that the ball 30 will never cover and close the port 32B or the port 341. Material 50 including fluid containing suspended particles may freely flow through the ports 32B and 34B.

Figure 9:
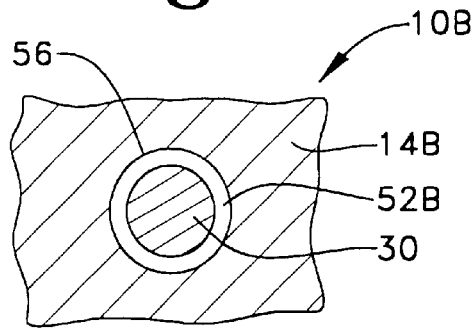
FIG. 9 is a cross-sectional view of the ball reversal orifice taken along line 9—9 of FIG. 8.

FIG. 8 shows the ball 30 location with material 50 flowing in a first direction through the first conduit 36B, through the port 323, through the cavity 18B, and exiting through the port 343 into the second conduit 38B. The material 50 may be, e.g., a liquid, a hydraulic fluid, a gas, or a plurality of small particles. The small particles may be suspended in the gas or liquid. FIG. 9 shows a cross-sectional view taken along line 9—9 of FIG. 8. A gap 52B is formed between the ball 30 and the first cylindrical portion 56. The material 50 is restricted as the material 50 flows through the gap 52B.

Figure 10:
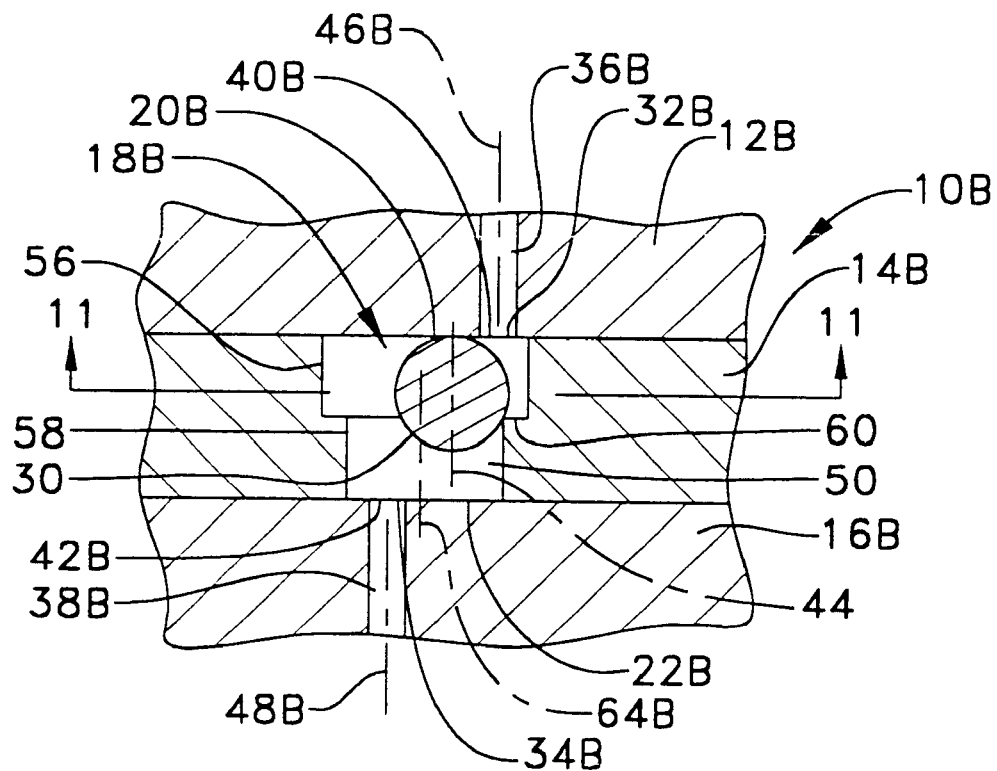
FIG. 10 is a cross-sectional view of the ball reversal orifice of FIG. 7 with the flow reversed.
Figure 11:
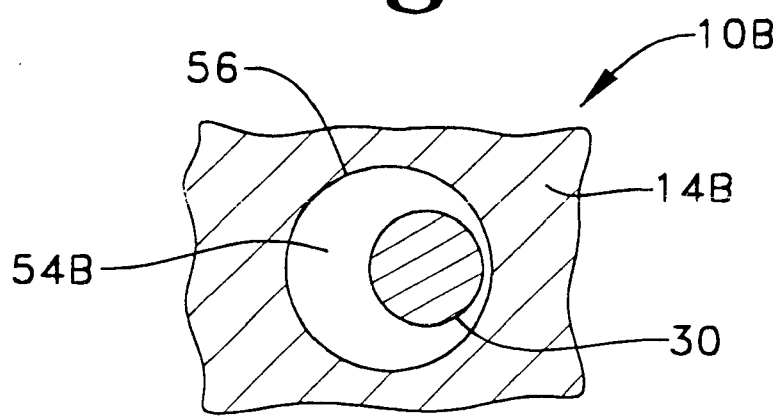
FIG. 11 is a cross-sectional view of the ball reversal orifice taken along line 11—11 of FIG. 10.

FIG. 10 shows the ball reversal orifice 10B with the material 50 flowing in a second direction through the second conduit 38B, through the port 34B, through the cavity 18B, and exiting through the port 32B into the first conduit 36B. The material 50 pushes the ball 30 against the first wall 20B of the cavity 18B. The center 40B of the port 32B and the longitudinal axis 46B of the first conduit 36B are always offset from the centerline 44 of the ball 30. Thus, the ball 30 never covers or closes the port 32B. FIG. 10 shows a longitudinal axis 64B of the cavity 18B. The longitudinal axis 62B is in-line with the longitudinal axis of the first cylindrical portion 56 and the longitudinal axis of the second cylindrical portion 58. FIG. 11 shows a cross-sectional view taken along line 11—11 of FIG. 10. A gap 54B is formed between the ball 30 and the first cylindrical portion 56. The gap 54B is larger in flow area than the flow area created by the gap 52B (FIG. 9). Therefore, there is greater restriction to material 50 flow when the material 50 flow is in the first direction, from the port 32B to port 34B, then when the material 50 flow is in the second direction, from port 34B to 32B.

In a manner similar to the ball reversal orifice 10A shown in FIG. 6, the longitudinal axis 46B of the first conduit 36B, the center 40B of the port 32B, the longitudinal axis 48B of the second conduit 38B, and the center 42B of the port 34B, may be located in-line. However, this in-line axis is always offset from the centerline 44 of the ball 30.

Industrial Applicability

Those skilled in the art will appreciate that the valve or ball reversal orifice 10 described above is intended to provide a first flow restriction to a material 50 flowing through the ball reversal orifice 10 and a second flow restriction when the material 50 reverses flow direction through the ball reversal orifice 10. The ball reversal orifice 10 is compact and can be easily installed in small passageways. The ball reversal orifice 10 does not clog with particles being carried in the fluid flow. Additionally, the ball reversal orifice 10 may be oriented in any suitable orientation (e.g., vertical, horizontal, etc.). The ball reversal orifice 10 may be made from any suitable material (e.g., metal, plastic, etc.). The cavity 18 of the valve or ball reversal orifice 10 may be formed by any suitable housing.

It should be appreciated by those skilled in the art that the present invention is not limited by the use disclosed herein. Rather, the ball reversal orifice 10 ball 30 of the present invention could be used to restrict material 50 flow in any flow system where restriction depending on flow direction is desired. Additionally, the shape of the cavity 18 may be of any suitable size shape or configuration, as long as the cross-sectional area taken perpendicular to the longitudinal axis 64 of the cavity 18 decreases from one of the walls 20, 22 to the other wall 20, 22.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A valve comprising:
   a housing having at least first and second walls that define a cavity therein, said cavity being configured such that a cross-sectional area of said cavity taken perpendicular to a longitudinal axis of the cavity decreases from the second wall to the first wall;
   a port in the first wall for allowing material to enter or exit the cavity;
   a port in the second wall for allowing material to enter or exit the cavity;
   a flow restrictor disposed in the cavity, and being freely moveable between a first position in contact with the first wall, and a second position in contact with the second wall;
   a large flow area past the flow restrictor in the first position, and small flow area past the flow restrictor in the second position; and
   the flow restrictor is a ball and wherein a center of each of said ports is offset from a centerline of the ball relative to the longitudinal axis of the cavity.

2. The valve of claim 1, wherein material flowing from the port in the first wall to the port in the second wall meets greater resistance than material flowing from the port in the second wall to the port in the first wall.

3. The valve of claim 1, wherein said cross-sectional area of said cavity taken perpendicular to a longitudinal axis of the cavity has a frusto-conical shape.

4. The valve of claim 1, wherein said cavity comprises a plurality of interconnected cylindrical portions.

5. The valve of claim 1 wherein said housing is formed by a plurality of adjacent plate members.

6. The valve of claim 1, further including a first conduit in communication with the port in the first wall of the cavity, and a second conduit in communication with the port in the second wall of the cavity.

7. The valve of claim 6, wherein the flow restrictor is a ball and wherein a longitudinal axis of the first conduit and a longitudinal axis of the second conduit are offset from a centerline of the ball.

8. The valve of claim 7, wherein the longitudinal axis of the first conduit is offset with respect to the longitudinal axis of the second conduit.

9. The valve of claim 8, wherein the longitudinal axis of the first conduit is parallel with respect to the longitudinal axis of the second conduit.

10. A valve comprising:
    a housing with a flow passage disposed therein, and the flow passage including an enlarged cavity;
    a ball trapped in said cavity and being free to move between a first position in contact with a first wall and a second position in contact with a second wall;
    said flow passage being unrestrictive to fluid flow when said ball is in said first position but restrictive to fluid flow when said ball is in said second position;
    said flow passage includes a first conduit that opens to said cavity through said first wall;
    said flow passage includes a second conduit that opens to said cavity through said second wall; and
    a flow area past the ball when in the second position is an area of a large circle minus an area of a small circle.

11. The valve of claim 10 wherein the first wall is parallel to the second wall.

12. The valve of claim 10 wherein the first wall is separated from the second wall by a circumferential portion that includes at least one of a frusto-conical shape and a plurality of cylindrical portions.

13. A valve comprising:
    a housing with a flow passage disposed therein, and the flow passage including an enlarged cavity;
    a ball trapped in said cavity and being free to move between a first position in contact with a first wall and a second position in contact with a second wall;
    said flow passage being unrestrictive to fluid flow when said ball is in said first position but restrictive to fluid flow when said ball is in said second position;
    said flow passage includes a first conduit that opens to said cavity through said first wall;
    said flow passage includes a second conduit that opens to said cavity through said second wall; and
    said cavity has a longitudinal axis offset from said first conduit and said second conduit.

14. A valve comprising:
    a housing with a flow passage disposed therein, and the flow passage including an enlarged cavity;
    a ball trapped in said cavity and being free to move between a first position in contact with a first wall and a second position in contact with a second wall;
    said flow passage being unrestrictive to fluid flow when said ball is in said first position but restrictive to fluid flow when said ball is in said second position;
    said flow passage includes a first conduit that opens to said cavity through said first wall;
    said flow passage includes a second conduit that opens to said cavity through said second wall; and
    said housing includes a first plate that defines said first conduit;
    a second plate that defines said second conduit; and
    a third plate positioned between the first plate and the second plate, and including a circumferential portion that defines a portion of said cavity.

* * * * *

UNITED STATES PATENT AND TRADEMARK OFFICE
CERTIFICATE OF CORRECTION

PATENT NO.    : 6,631,738 B2
DATED         : October 14, 2003
INVENTOR(S)   : Mingxiang Jiang It is certified that error appears in the above-identified patent and that said Letters Patent is hereby corrected as shown below:

<u>Title page,</u>
Item [57], ABSTRACT,
Line 4, delete the word "provide".

<u>Column 5,</u>
Line 38, delete the word "decreases" and insert -- increases --.

Signed and Sealed this

Sixth Day of April, 2004

JON W. DUDAS
*Acting Director of the United States Patent and Trademark Office*